(12) United States Patent
Yu et al.

(10) Patent No.: US 10,461,373 B2
(45) Date of Patent: Oct. 29, 2019

(54) ADDING DRY METAL OXIDE FOR METAL NITRIDE PARTICLES TO IMPROVE BATTERY CYCLE LIFE AND POWER PERFORMANCE

(71) Applicant: GM GLOBAL TECHNOLOGY OPERATIONS LLC, Detroit, MI (US)

(72) Inventors: Zhiqiang Yu, Shanghai (CN); Dewen Kong, Shanghai (CN); Meiyuan Wu, Shanghai (CN)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 194 days.

(21) Appl. No.: 15/355,101

(22) Filed: Nov. 18, 2016

(65) Prior Publication Data

US 2017/0162917 A1    Jun. 8, 2017

Related U.S. Application Data

(60) Provisional application No. 62/262,439, filed on Dec. 3, 2015.

(51) Int. Cl.
 *H01M 10/42* (2006.01)
 *H01M 4/62* (2006.01)
 (Continued)

(52) U.S. Cl.
 CPC ........ *H01M 10/4235* (2013.01); *H01G 11/06* (2013.01); *H01G 11/46* (2013.01);
 (Continued)

(58) Field of Classification Search
 CPC . H01M 10/4235; H01M 10/0567; H01M 4/62
 See application file for complete search history.

(56) References Cited

U.S. PATENT DOCUMENTS

| | | | | |
|---|---|---|---|---|
| 6,183,718 | B1* | 2/2001 | Barker | C01G 45/1221 423/599 |
| 6,986,970 | B1* | 1/2006 | Kumar | H01M 10/0567 429/188 |

(Continued)

FOREIGN PATENT DOCUMENTS

| | | |
|---|---|---|
| CN | 1351767 A | 5/2002 |
| CN | 1571198 A | 1/2005 |
| CN | 2694501 Y | 4/2005 |

*Primary Examiner* — Jonathan G Jelsma
(74) *Attorney, Agent, or Firm* — Reising Ethington P.C.

(57) ABSTRACT

An assembled electrochemical cell is formed comprising an anode containing sub-micrometer and micrometer-size particles of an anode material for cyclically intercalating and de-intercalating lithium ions or sodium ions, a cathode containing like-sized particles of a cathode material for intercalating and de-intercalating the ions utilized in the anode, and a non-aqueous electrolyte composed for transporting ions between the anode and cathode. Nanometer-size particles of a basic metal oxide or a metal nitride are mixed with at least one of (i) the particles of electrode material for at least one of the anode and cathode and (ii) the electrolyte. The composition and the amount of the metal oxide or metal nitride is determined for chemically neutralizing acidic contaminants formed in the operation of the electrochemical cell, adsorbing incidental water, and to generally prevent degradation of the respective electrode materials.

6 Claims, 1 Drawing Sheet

(51) Int. Cl.
  *H01M 10/0567* (2010.01)
  *H01G 11/06* (2013.01)
  *H01G 11/46* (2013.01)
  *H01G 11/86* (2013.01)
  *H01M 4/485* (2010.01)
  *H01M 4/505* (2010.01)
  *H01M 10/0525* (2010.01)
  *H01M 4/13* (2010.01)
  *H01M 4/131* (2010.01)
  *H01M 10/054* (2010.01)

(52) U.S. Cl.
  CPC .............. *H01G 11/86* (2013.01); *H01M 4/13* (2013.01); *H01M 4/131* (2013.01); *H01M 4/485* (2013.01); *H01M 4/505* (2013.01); *H01M 4/62* (2013.01); *H01M 10/054* (2013.01); *H01M 10/0525* (2013.01); *H01M 10/0567* (2013.01); *H01M 2220/20* (2013.01); *H01M 2300/0025* (2013.01); *Y02E 60/122* (2013.01)

(56) References Cited

U.S. PATENT DOCUMENTS

| | | | |
|---|---|---|---|
| 7,700,240 B2 * | 4/2010 | Bhattacharryya | H01M 6/181 429/306 |
| 2006/0121352 A1 * | 6/2006 | Kejha | H01M 4/131 429/232 |
| 2009/0317724 A1 * | 12/2009 | Kumar | H01M 10/056 429/320 |
| 2014/0107275 A1 * | 4/2014 | Uemura | H01M 4/628 524/503 |
| 2014/0193715 A1 * | 7/2014 | Park | H01M 4/485 429/231.1 |
| 2016/0036046 A1 * | 2/2016 | Takebayashi | H01M 4/628 429/223 |
| 2016/0036057 A1 * | 2/2016 | Tsukagoshi | H01M 4/628 429/215 |
| 2016/0344018 A1 * | 11/2016 | Chiu | H01M 4/134 |

* cited by examiner

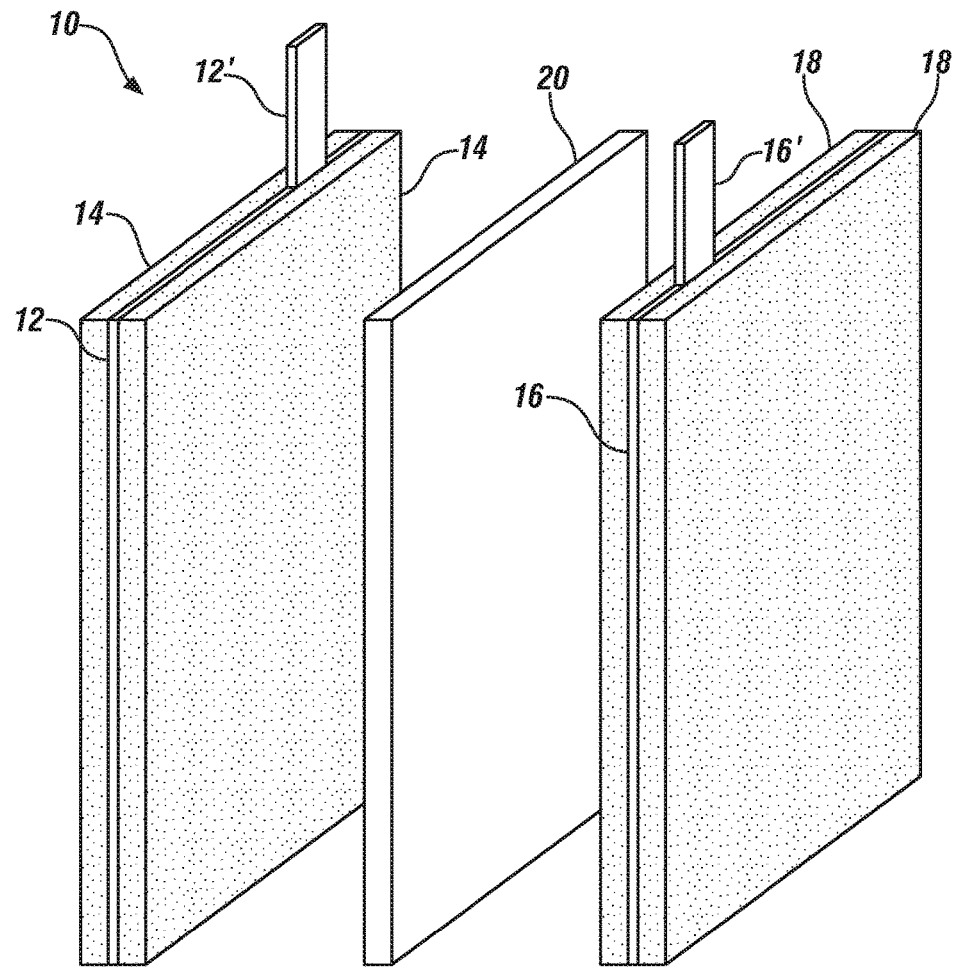
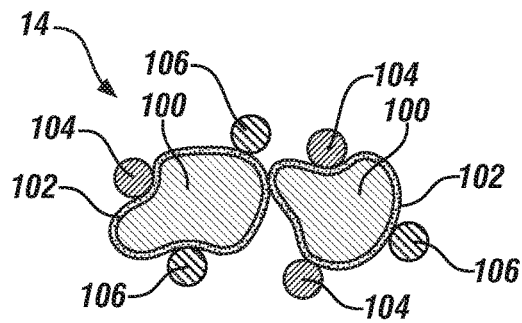
FIG. 2
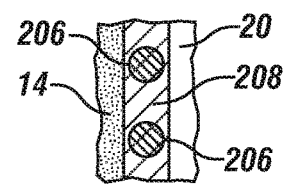
FIG. 3

ADDING DRY METAL OXIDE FOR METAL NITRIDE PARTICLES TO IMPROVE BATTERY CYCLE LIFE AND POWER PERFORMANCE

This application claims priority based on provisional application 62/262,439, titled "Adding Dry Metal Oxide Or Metal Nitride Particles To Improve Battery Cycle Life And Power Performance," filed Dec. 3, 2015 and which is incorporated herein by reference.

TECHNICAL FIELD

This disclosure pertains to mixing nanometer-size particles of metal oxide and/or metal nitride, which display a base reaction and contain very little adsorbed water, with sub-micrometer size or micrometer-size particles of active electrode material, or with a non-aqueous electrolyte, for use in an electrochemical cell which may produce unwanted fluorine or another acidic substance that impairs the function of the electrode particles. For example, electrode particles for use in a lithium-ion cell, or the electrolyte for use in the cell, may be mixed with smaller oxide particles formed of, for example, $Li_2O$ (Group IA), MgO (Group IIA), $Sc_2O_3$ (Group IIIB), or $Al_2O_3$ (Group IIIA), or with smaller nitride particles formed of $Li_3N$ (Group IA), $Mg_3N_2$ (Group IIA), BN (Group IIIA), or TiN (Group IVB). Also, small particles of silica ($SiO_2$) may be used as the absorbent material.

BACKGROUND OF THE INVENTION

The material presented as background information in this section of the specification is not necessarily prior art.

Assemblies of lithium-ion battery cells are finding increasing applications in providing motive power in automotive vehicles, aerospace applications, consumer electronics, and in many other commercial applications requiring low weight, highly-efficient electrical power sources. Lithium-sulfur cells, lithium-air cells, sodium-sulfur cells, and other lithium electrode cells, utilized with anhydrous electrolytes, and capacitors of like electrode combinations, are also candidates as a power source for commercial applications requiring an efficient, high power density, electrical power source.

Such electrical power-producing devices typically employ particles of active anode and cathode materials that enable lithium ions or sodium ions to be transported in an anhydrous liquid electrolyte between the electrodes.

For example, each cell of a lithium-ion battery is capable of providing an electrical potential of about three to four volts and a direct electrical current based on the composition and mass of the electrode materials in the cell. The cell is capable of being discharged and re-charged over many cycles. A battery is assembled for an application by combining a suitable number of individual cells in a combination of electrical parallel and series connections to satisfy voltage and current requirements for a specified electric motor or other application. In a lithium-ion battery application for an electrically powered vehicle, the assembled battery may, for example, comprise up to three hundred packaged cells that are electrically interconnected to provide forty to four hundred volts and sufficient electrical power to an electrical traction motor to drive a vehicle. The direct current produced by the battery may be converted into an alternating current for more efficient motor operation.

The batteries may be used, for example, as the sole motive power source for electric motor-driven electric vehicles or as a contributing power source in various types of hybrid vehicles, powered by a combination of an electric motor(s) and a hydrocarbon-fueled engine.

In these automotive applications, each lithium-ion cell typically comprises a negative electrode layer (anode, during cell discharge), a positive electrode layer (cathode, during cell discharge), a thin porous separator layer interposed in face-to-face contact between parallel facing electrode layers, and a lithium-containing, anhydrous liquid, electrolyte solution filling the pores of the separator and contacting the facing surfaces of the electrode layers for transport of lithium ions during repeated cell discharging and re-charging cycles. Each electrode is prepared to contain a porous layer of an electrode material, typically deposited on a major surface of a thin layer of a metallic current collector.

For example, the negative electrode material has been formed by depositing a thin layer of polymer resin-bonded graphite or lithium titanate (LTO) particles, often mixed with conductive carbon black, onto one or both sides of a thin metal foil (an aluminum foil for LTO electrode particles) which serves as the current collector for the negative electrode. The positive electrode also comprises a thin layer of resin-bonded, porous particulate, lithium-metal-oxide composition bonded to a thin aluminum foil which serves as the current collector for the positive electrode. Thus, the respective electrodes have been made by dispersing mixtures of the respective binders and active particulate materials in a suitable solvent or dispersing liquid, depositing the liquid-particulate solid mixture as a layer of controlled thickness on the surface of a current collector foil, and drying, pressing, and fixing the resin-bonded electrode particles to their respective current collector surfaces. The positive and negative electrodes may be formed on current collector sheets of a suitable area and shape, and cut (if necessary) and folded, rolled, or otherwise shaped for assembly into lithium-ion cell containers with suitable porous separators and a non-aqueous liquid electrolyte.

Other electrochemical cell and capacitor combinations may be organized and prepared in an analogous manner as the lithium-ion cells.

In many of these electrochemical cells the electrolyte is a halogen-containing compound that may release fluorine, chlorine, or other unwanted acidic material that can harm the chemical function of the particulate electrode materials. There is a need for a simple and low-cost practice for protecting the electrode particles from harm resulting from the release of an un-wanted acidic substance in the repeated charge-discharge operating cycles of the battery or capacitor, in high temperature storage of the device, or by reaction of incidental or intruding water at any time with the electrolyte salt.

SUMMARY

In electrochemical cells that function with the transport of lithium ions or sodium ions, the electrolyte that transports the ions often comprises a lithium-containing compound or a sodium-containing compound that also contains a halogen such as fluorine or chlorine. For example, in lithium cells, suitable electrolyte salts include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium trifluoroethanesulfonimide, and lithium bis(trifluoromethanesulfonyl) imide (LiTFSI). These solid electrolyte salts are usually dissolved in suitable organic solvents. Some examples of such non-aqueous solvents that may be used to dissolve the electrolyte salt include ethylene carbonate, dimethyl carbonate, methylethyl carbonate, propylene carbonate. There are other lithium salts that may be used and other solvents. But a combination of lithium salt and solvent is selected for providing suitable mobility and transport of lithium ions in the operation of the cell. In the event that moisture enters a lithium cell, or that water is formed by reactions within a cell, fluorine, chlorine, or an acidic halide compound may be formed, like $PF_5$ or HF, which can damage electrode particles or an electrode current collector.

Accordingly, it is desired to protect the electrodes of a lithium or sodium cell, for example, by utilizing nanometer-size (a few nanometers to several hundred nanometers in largest dimension) particles of one or more of the oxides and/or nitrides of a suitable Group IA, IIA, IIIA, IIIB, and IVB metal, or rare earth metal within the cell to neutralize any such acidic contaminant formed during the repeated operation of the cell materials. Examples of readily available, inexpensive, and suitable metal oxides include $Li_2O$, $Na_2O$, MgO, CaO, SrO, BaO, RaO, $Al_2O_3$, $Sc_2O_3$, or $Ce_2O_3$. Examples of suitable metal nitrides include $Li_3N$, $Mg_3N_2$, $Ca_3N_2$, $Sr_3N_2$, $Ba_3N_2$, BN, AlN, or TiN. Preferably, but not necessarily, when such metal oxides or metal nitrides are dispersed in water they display pH values of 7 and higher. For example, $Al_2O_3$ particles may display a pH value less than 7, but they are suitable for use in the subject method of protecting electrode particles. Also, oxide particles of $SiO_2$ (formed of the metalloid, silicon) may be used. Metal oxide particles and metal nitride particles typically are available with low levels of adsorbed water (<500 ppm). They display the tendency to react with acidic substances, but they are chemically and electrochemically stable in the environment of the subject electrochemical cells. In the subject electrochemical cells the metal oxide or metal nitride particles are dispersed and mixed in a non-aqueous liquid or with particles of an electrode material. But they have the capability of absorbing traces of water and of reacting with un-wanted acidic contaminants that may be formed in the extended operation of the electrochemical cell.

In one embodiment, a suitable quantity of the very small metal oxide or metal nitride particles may be dispersed in a liquid electrolyte as it is introduced into an assembly of cell elements. In a similar embodiment, a suitable quantity of the small metal oxide or metal nitride particles may be mixed with solid electrolyte particles as they are placed with and into an assembly of cell elements. In these embodiments the nanometer-size metal oxide or metal nitride particles are in intimate contact with the electrolyte of the cell and positioned to react with unwanted water or acidic substances, if they are formed during cell operation and before the contaminants damage the electrode members of the cell.

In another embodiment of the disclosure, the nanometer-size metal oxide or metal nitride particles are mixed with the somewhat larger (e.g., sub-micrometer or micrometer size) particles of electrode material for one or both electrodes. For example, the metal oxide or metal nitride particles are thoroughly mixed in a predetermined amount up to about twenty percent of the weight of the particles of active electrode material. The metal oxide or metal nitride particles are utilized to protect the nearby particles of electrode material. The basic metal oxide or metal nitride particles are used to adsorb any water or to react with any unwanted newly-formed acidic contaminants in the cell as such contaminants may tend to migrate into contact the electrode particles. The neutralized reaction products may remain in the vicinity of the electrode particles but they are now less harmful to the operation of the electrode.

Typically, active electrode particles are resin-bonded as a generally porous and uniformly thick layer on one or both sides of a current collector foil member. The thickness of the porous bonded layer is many times the diameters or largest dimensions of the individual particles. An example of a suitable resin binder is polyvinylidenedifluoride (PVDF), and an example of a suitable solvent for the PVDF binder is N-methyl-2-pyrrolidone (NMP) in the bonding of the electrode particles in a porous electrode layer to both sides of the current collector. Often the lithium-intercalating or sodium-intercalating electrode particles are also mixed with particles of carbon black or a like electron conductor to improve electron conductivity within a cell. In accordance with various embodiments of this invention, the metal oxide or metal nitride particles may be mixed with the electrode particles, organic resin binder material, and conductivity materials in variety of ways. The goal is to provide a layer of electrode material bonded to a current collector without impeding the function of the components of the electrode material. Several such practices will be illustrated below in this specification.

Thus, the basic metal oxide or metal nitride particles, mixed with the active electrode material particles, or with the electrolyte, serve to adsorb water and/or to neutralize acidic contaminants that are undesirably formed during cell operation, to protect the electrode material and its function.

Other objects and advantages of the practice of the invention will become apparent from specific practices of the invention presented in the illustrative examples.

BRIEF DESCRIPTION OF THE DRAWINGS

FIG. 1 is an enlarged schematic illustration of a spaced-apart assembly of three solid members of a lithium-ion electrochemical cell. The three solid members are spaced apart in this illustration to better show their structure. The illustration does not include an electrolyte solution whose composition and function will be described in more detail below in this specification.

FIG. 2 is an enlarged schematic illustration of a small grouping of conductivity particles and metal oxide or metal nitride particles with resin-bonded electrode particles that could be used, for example, in preparing the anode layer 14 of FIG. 1.

FIG. 3 is an enlarged schematic illustration of a small portion of a liquid electrolyte containing dispersed metal oxide or metal nitride particles. Such a mixture of metal oxide or metal nitride particles and liquid electrolyte could be placed, for example, between separator 20 and anode layer 14 of FIG. 1. Although not shown in this enlarged schematic illustration, in an operable electrochemical cell, the electrolyte and its dispersed particles permeate the pores of the separator and the pores of the electrode material in order to remove contaminants and to protect the electrode material.

DESCRIPTION OF PREFERRED EMBODIMENTS

An active lithium-ion cell electrode material is an element or compound which accepts or intercalates lithium ions, or releases or gives up lithium ions in the discharging and re-charging cycling of the cell. A few examples of suitable electrode materials for the anode electrode (negative electrode) of a lithium ion cell are graphite, silicon, alloys of silicon with lithium or tin, silicon oxides ($SiO_x$), and lithium titanate. During cell-discharge, electrons are released from the anode material into the electrical power-requiring external circuit and lithium ions are released (de-intercalated) into an anhydrous electrolyte. Lithium titanate (LTO) is a preferred anode material. In one embodiment of this disclosure, nanometer-size particles of an acid-consuming metal oxide or metal nitride are mixed with larger sub-micrometer or micrometer-size (e.g., 50 nm to 50 µm in largest dimension) particles of lithium titanate or other negative electrode material.

Examples of positive electrode materials (cathode) include lithium manganese oxide spinels ($LiMn_2O_4$, sometimes LMO herein), lithium nickel oxide, lithium cobalt oxide and other lithium-metal-oxides. In embodiments of this disclosure, nanometer-size particles of an acid-consuming metal oxide or metal nitride are mixed with somewhat larger size (e.g., 50 nm to 50 µm) particles of lithium manganese oxide, lithium cobalt oxide, or other positive electrode material.

FIG. 1 is an enlarged schematic illustration of a spaced-apart assembly 10 of three solid members of a lithium-ion electrochemical cell. The three solid members are spaced apart in this illustration to better show their structure. The illustration does not include an electrolyte solution whose composition and function will be described in more detail below in this specification.

In FIG. 1, a negative electrode consists of a relatively thin, conductive metal foil current collector 12. Depending upon the composition of a specific negative electrode material, the negative electrode current collector 12 is typically formed of a thin layer of aluminum or of copper. The thickness of the metal foil current collector is suitably in the range of about ten to twenty-five micrometers. The current collector 12 has a desired two-dimensional plan-view shape for assembly with other solid members of a cell. Current collector 12 is illustrated as having a major surface with a rectangular shape, and further provided with a connector tab 12' for connection with other electrodes in a grouping of lithium-ion cells to provide a desired electrical potential or electrical current flow.

Deposited on both major faces of the negative electrode current collector 12 are thin, porous layers of negative electrode material 14. In an illustrated example of this disclosure, the negative electrode material comprises sub-micrometer or micrometer-size (50 nm to 50 µm) particles of lithium titanate ($Li_4Ti_5O_{12}$, sometimes LTO in this specification) which are intimately mixed with nanometer size particles of a metal oxide, such as magnesium oxide, MgO, which are employed to protect LTO from acidic contaminants during cell operation and from incidental water. The particles of LTO are also often mixed with particles of conductive carbon, or the like, for enhanced electron conductivity. The LTO negative electrode particles are typically suitably bonded in a porous layer to an aluminum current collector 12 with a polymeric resin such as polyvinylidene difluoride (PVDF) using, for example, N-methyl-2-pyrrolidone, as a processing solvent. As illustrated in FIG. 1, the layers of negative electrode material 14 are typically co-extensive in shape and area with the main surface of their current collector 12. The dried particulate electrode material has sufficient porosity to be infiltrated by a liquid, non-aqueous, lithium-ion containing electrolyte and to perform its electrode function. In accordance with embodiments of this invention, the thickness of the rectangular layers of LTO-containing negative electrode material may be up to about two hundred micrometers so as to provide a desired current and power capacity for the negative electrode.

A positive electrode is shown, comprising a positive current collector foil 16 and, on each major face, a coextensive, overlying, porous deposit of resin-bonded, particulate, positive electrode material 18. For example, the positive electrode material may be particles of lithium manganese oxide spinels (LMO) mixed with smaller protective particles of magnesium oxide. Positive current collector foil 16 also has a connector tab 16' for electrical connection with other electrodes in a grouping of lithium-ion cells or with other electrodes in other cells that may be packaged together in the assembly of a lithium-ion battery. The positive current collector foil 16 and its opposing coatings of porous positive electrode material 18 are typically formed in a size and shape that are complementary to the dimensions of an associated negative electrode. In the illustration of FIG. 1, the two electrodes are identical in their shapes and assembled in a lithium-ion cell with a major outer surface of the negative electrode material 14 facing a major outer surface of the positive electrode material 18. The thicknesses of the rectangular positive current collector foil 16 and the rectangular layer of positive electrode material 18 are typically determined to complement the negative electrode material 14 in producing the intended electrochemical capacity of the lithium-ion cell. The thicknesses of current collector foils are typically in the range of about 10 to 25 micrometers. And the thicknesses of the respective electrode materials are typically up to about 200 micrometers.

A thin porous separator layer 20 is interposed between a major outer face of the negative electrode material layer 14 (as illustrated in FIG. 1) and a major outer face of the positive electrode material layer 18. A like separator layer 20 could also be placed against each of the opposite outer layer of negative electrode material 14 and the opposite outer layer of positive electrode material 18 if the illustrated individual cell assembly 10 is to be combined with like assemblies of cell members to form a battery with many cells.

In many battery constructions, the separator material is a porous layer of a polyolefin, such as polyethylene (PE) or polypropylene (PP). Often the thermoplastic material comprises inter-bonded, randomly oriented fibers of PE or PP. The fiber surfaces of the separator may be coated with particles of alumina, or other insulator material, to enhance the electrical resistance of the separator, while retaining the porosity of the separator layer for infiltration with liquid electrolyte and transport of lithium ions between the cell electrodes. The separator layer 20 is used to prevent direct electrical contact between the facing negative and positive electrode material layers 14, 18, and is shaped and sized to serve this function. In the assembly of the cell, the facing major faces of the electrode material layers 14, 18 are pressed against the major area faces of the separator membrane 20. A liquid electrolyte is typically injected into the pores of the separator 20 and electrode material layers 14, 18. In accordance with practices of this invention the liquid electrolyte may contain dispersed particles of a metal oxide or a metal nitride.

The electrolyte for the lithium-ion cell is often a lithium salt dissolved in one or more organic liquid solvents. Examples of suitable salts include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium trifluoroethanesulfonimide, and lithium bis(trifluoromethanesulphonyl) imide. Some examples of solvents that may be used to dissolve the electrolyte salt include ethylene carbonate, dimethyl carbonate, methylethyl carbonate, propylene carbonate. There are other lithium salts that may be used and other solvents. But a combination of lithium salt and solvent is selected for providing suitable mobility and transport of lithium ions in the operation of the cell. The electrolyte is carefully dispersed into and between closely spaced layers of the electrode elements and separator layers. The electrolyte is not illustrated in FIG. 1 because it is difficult to illustrate between tightly compacted electrode layers. But halogen gas or other acidic material may be formed in the electrolyte and attack active particles in one or both of the electrodes. The unwanted acidic material may be released during repeated charge/discharge cycling of the cell or battery, high temperature storage of the device, or by reaction between incidental water and electrolyte salts at any conditions.

In accordance with practices of this disclosure, nanometer-size particles of a basic metal oxide or a metal nitride may be mixed and dispersed with the electrolyte solution. The basic metal oxide particles are added in an amount or proportion which will neutralize any small amounts of acidic contaminants that are formed in or enter the liquid electrolyte and which can adsorb any water formed in or entering the cell. But the proportion of metal oxide or metal nitride particles is employed at a level which does not adversely affect the continuity of the electrolyte in the cell and its ability to transport lithium or sodium ions between the electrodes of the cell. The proportion of metal oxide and/or metal nitride particles dispersed in the electrolyte may be determined for each application but is typically in the range of 0.01 to 20 weight percent of the electrolyte. A suitable mixture of metal oxide and metal nitride particles may be dispersed in the electrolyte, but in most situations metal oxide particles or metal nitride particles are used alone.

In those lithium or sodium cells that employ a solid electrolyte, metal oxide or metal nitride particles may be mixed with the electrolyte particles before they are placed against the respective electrodes during the assembly of cell members.

In many instances it may be preferred to mix the small particles of metal oxide or of metal nitride with the larger particles of active electrode material. As described above in this specification, a common way of forming electrode members for lithium batteries or sodium batteries is to mix particles of the selected active electrode material with a solution of a suitable organic binder resin to form a formable or workable slurry of the particulate material. Fine particles of electrically conductive carbon black or the like may be included in the slurry mixture. The slurry is then carefully spread over one or both surfaces of a conductive metal current collector sheet or foil in a suitable pattern of suitable uniform thickness over the surface(s). Since the binder resin is in solution, the mixed electrode particles and conductive particles are coated with a thin layer of the solution. The resulting slurry coating is porous. As the solvent is evaporated the remaining resin is deposited on the surfaces of the mixed particles. The coated particles may be heated to complete solvent removal and any flow and/or curing of the binder resin on the surfaces of the mixed particles. The particles of the finished electrode coating layer are suitably bonded to each other to form a functional porous electrode layer, and the porous electrode layer is adherently bonded to the surface of the current collector in a uniform layer that is, for example up to about 200 micrometers thick. The porosity of the electrode layer is managed to permit infiltration of the pores with an electrolyte, typically a fluid anhydrous liquid electrolyte solution of suitable viscosity.

In accordance with embodiments of this disclosure, nanometer-size particles of a basic metal oxide or metal nitride are mixed into a binder resin-containing slurry of electrode material. This addition of metal oxide or metal nitride particles may be accomplished in a few different ways depending on available mixing equipment and the nature of the selected materials being processed.

As stated above in this specification, it is preferred that selected particles of a metal oxide or metal nitride have a largest dimension in the range of one nanometer to 1000 nanometers, a pH value (when dispersed in water) of from 7 to 12, less than about 500 ppm of adsorbed water, and be chemically and electrochemically stable in the selected battery environment (non-contaminated with an unwanted acid material). Again, $Al_2O_3$ may have a pH value less than 7 and be suitable for use with an electrolyte or electrode material. Examples of candidate metal oxides include $Li_2O$, $Na_2O$, $RaO$, $MgO$, $CaO$, $SrO$, $BaO$, $Al_2O_3$, $Sc_2O_3$, or $Ce_2O_3$. Examples candidate metal nitrides include $Li_3N$, $Mg_3N$, $Ca_3N_2$, $Sr_3N$, $BaN_2$, $BN$, $AlN$, or $TiN$. In general, either a metal oxide or a metal nitride is used in combination with particles of an electrode material in a specific application. Also, small particles of $SiO_2$, based on the metalloid silicon, may be used.

In the following examples, magnesium oxide particles will be used as the metal oxide, polyvinylidene difluoride (PVDF) will be used as the binder resin, and N-methyl-2-pyrroledione (NMP) will be used as the solvent for the PVDF and dispersant for the electrode material particles. Lithium titanate (micrometer size particles) is a preferred anode material and lithium manganese oxide (micrometer size particles) is a preferred cathode material. And carbon black soot is a suitable additive to enhance electron conductivity. In general it is preferred to incorporate conductivity material and metal oxide particles (or metal nitride particles) in the preparation of both anode and cathode member preparations.

An illustration of a specific anode composition (on a weight percentage basis of the total weight of the mix) is 90.5% LTO, 6% conductive carbon, 0.5% magnesium oxide, and 3% PVDF. In general, 0.01% to 20% by weight of the metal oxide (or metal nitride) is used in the mixture with the particles of active anode material particles. And, in general, the LTO anode mixture is dispersed in NMP such that the solid content of the slurry is 35-50 wt. %.

A cathode composition may be similarly proportioned. An illustration of a specific cathode composition (on a weight percentage basis) is 90% LMO, 6% conductive carbon, 1% magnesium oxide, and 3% PVDF. In general, the LMO cathode mixture is dispersed in NMP such that the solids content of the slurry is 50-70 wt. %.

In a first illustration of a suitable practice for adding nanoparticles of a metal oxide (or a metal nitride) to the remainder of the electrode materials (anode or cathode mixture), the selected proportion of magnesium oxide powder is dispersed in a suitable volume of fresh NMP. This dispersion may be formed by vigorous stirring of the solid-liquid mixture or by applying ultrasonic vibrations to the mixture. PVDF particles or a solution of PVDF in NMP is then added to the dispersion of magnesium oxide nanoparticles. After thorough mixing of the dissolved resin with the MgO particles, the active electrode material particles and the conductivity particles are stirred into the NMP solution/mixture to form a uniform slurry of suitable fluidity for application to a conductive metal sheet or foil current collector surface. After the fluid slurry has been carefully applied as a porous layer on the current collector surface, the NMP solvent is carefully evaporated from the electrode layer and recovered. A like process may be used in applying an electrode material layer to the opposing side of the current collector.

In a second illustration of a suitable practice for adding nanoparticles of a metal oxide or metal nitride to the remainder of the electrode materials, the selected proportion of magnesium oxide powder is mixed with the particles of active electrode material and with the particles of conductivity material to form a uniform dry mixture of the constituents. Separately, a solution of the binder resin (PVDF dissolved in NMP) is prepared using a volume of solvent that is suitable for also dispersing the dry mixture of electrode constituents. The materials are mixed to form a uniform slurry of suitable fluidity for application to a conductive metal sheet or foil current collector surface. After the fluid slurry has been carefully applied as a porous layer on the current collector surface, the NMP solvent is carefully evaporated from the electrode layer and recovered. Again, a like process may be used in applying an electrode material layer to the opposing side of the current collector.

In an illustration of a third method of preparing electrode layers, the active electrode particles and the conductivity material particles are dispersed in a solution of the binder resin (again, for example, PVDF dissolved in NMP). A uniform workable slurry is prepared and the metal oxide (or metal nitride) particles are added to and dispersed in the previously formed slurry. The final slurry is prepared to have suitable fluidity for application to a conductive metal sheet or foil current collector surface. After the fluid slurry has been carefully applied as a porous layer on the current collector surface, the NMP solvent is carefully evaporated from the porous electrode material layer and recovered. Again, a like process may be used in applying an electrode material layer to the opposing side of the current collector.

In FIG. 1, described above, a resin-bonded layer of LTO anode material 14 is illustrated as bonded to opposing sides of an aluminum current collector 12. In accordance with practices of this disclosure, each resin-bonded anode layer 14 may be composed, for example, of micron-sized particles of lithium titanate mixed with nanometer-size particles of magnesium oxide, and powder particles of an electron conductivity enhancer. FIG. 2 is an enlarged, schematic illustration of a small portion of an anode layer 14 prepared in accordance with this disclosure. In the exemplary schematic fragmentary view of FIG. 2, lithium titanate particles 100 are thinly coated with PVDF resin 102 and bonded to nearby LTO particles 100, carbon black conductivity particles 104, and magnesium oxide particles 106 in a porous arrangement or structure. Thus, carbon black conductivity particles 104 and magnesium oxide particles 106 are homogeneously mixed with PVDF resin 102 and bonded to lithium titanate particles 100 in anode layer 14 and bonded to an aluminum current collector 12 as illustrated in FIG. 1.

FIG. 3 is an enlarged schematic illustration of the result when metal oxide or metal nitride particles 206 are dispersed in a non-aqueous liquid electrolyte 208. In an assembled lithium-ion cell, for example, the mixture of liquid electrolyte 208 and metal oxide or nitride particles 206 would be inserted within a porous separator, like separator 20 in FIG. 1, and the electrolyte would also be located between such a separator 20 and a facing porous anode layer 14 or porous cathode layer 18. The metal oxide or metal nitride particles thus dispersed in the liquid electrolyte 208 will permeate the pores of the separator 20 and of the porous electrode layer, such as the non-illustrated pores of anode layer 14.

Thus, electrochemical cells in which lithium ions or sodium ions are transferred between complementary electrodes during charging and discharging of the cell have found wide usage in commerce. But the electrolytes of the cells may incidentally generate unwanted acidic gases or liquids which can degrade the active electrode materials used in the cells. These cells include those used in lithium ion secondary batteries, lithium primary batteries, lithium sulfur batteries, lithium air batteries, lithium ion capacitors, sulfur batteries, and supercapacitors.

In accordance with this disclosure, practices for mixing small particles of a metal oxide or a metal nitride with particles for electrode members and/or with a non-aqueous liquid or solid electrolytes have been demonstrated in which the metal oxide or metal nitride particles are used to neutralize small amounts of unwanted acidic gases or liquids that may be unintentionally formed during prolonged cyclic operations of an electrochemical cell. The metal oxide and/or metal nitride particles are also intended to adsorb incidental or transient water which somehow enters a cell or is formed in the operation of the cell. The illustrative examples are not intended to be limiting of the scope of the following claims.

The invention claimed is:

1. An assembled electrochemical cell comprising an anode comprising micrometer-size or sub-micrometer size particles of an anode material for cyclically intercalating and de-intercalating lithium ions or sodium ions, a cathode comprising micrometer-size or sub-micrometer size particles of a cathode material for intercalating and de-intercalating the ions utilized in the anode, and a non-aqueous electrolyte composed for transporting ions between the anode and cathode, the electrochemical cell further being characterized by the presence of nanometer-size particles of a basic metal nitride which are mixed with the particles of electrode material for at least one of the anode and cathode, the resulting mixture or mixtures constituting particles of electrode material utilized in the electrochemical cell, the composition and amount of the metal nitride being determined for chemically neutralizing acidic contaminants formed in the operation of the electrochemical cell and for adsorbing incidental water.

2. The assembled electrochemical cell of claim 1 wherein the metal nitride particles are of one or more metal nitrides selected from the group consisting of $Li_3N$, $Mg_3N_2$, $Ca_3N_2$, $Sr_3N_2$, $Ba_3N_2$, BN, AlN, and TiN.

3. The assembled electrochemical cell of claim 1 wherein the particles of the basic metal nitride are mixed with one or both of the particles of anode material and the particles of cathode material in an amount up to twenty percent by weight of the electrode material.

4. The assembled electrochemical cell of claim 1 wherein the mixture of particles of basic metal nitride and an electrode material is resin-bonded in a porous layer of electrode material to a surface of a current collector sheet in the assembly of the electrochemical cell, the porous layer of electrode material being characterized by the presence of particles of basic metal nitride resin-bonded to surfaces of particles of electrode material which are resin-bonded to each other.

5. The assembled electrochemical cell of claim 1 wherein particles of the basic metal nitride are mixed with particles of lithium titanate and particles of an electron conductive material and the three-component solid mixture is resin-bonded in a porous layer of anode material to a surface of a current collector sheet in the assembly of the electrochemical cell.

6. The assembled electrochemical cell of claim 1 wherein particles of the basic metal nitride are mixed with particles of lithium manganese oxide and particles of an electron conductive material and the three-component solid mixture is resin-bonded in a porous layer of cathode material to a surface of a current collector sheet in the assembly of the electrochemical cell.

* * * * *